United States Patent

Higashi et al.

[11] Patent Number: 6,060,183
[45] Date of Patent: May 9, 2000

[54] PHASE RETARDER AND LIQUID CRYSTAL DISPLAY DEVICE USING THE SAME

[75] Inventors: Koji Higashi; Akiko Shimizu, both of Ibaraki, Japan

[73] Assignee: Sumitomo Chemical Company, Limited, Osaka, Japan

[21] Appl. No.: 08/887,892

[22] Filed: Jul. 3, 1997

[30] Foreign Application Priority Data

Jul. 3, 1996 [JP] Japan ................................. 8-173644

[51] Int. Cl.⁷ ................................................... B32B 9/00
[52] U.S. Cl. .................... 428/701; 428/702; 349/117; 349/118; 359/500
[58] Field of Search .................................. 349/117, 118; 359/500; 428/701, 702

[56] References Cited

U.S. PATENT DOCUMENTS

| | | | |
|---|---|---|---|
| 5,113,285 | 5/1992 | Franklin et al. | 359/465 |
| 5,430,566 | 7/1995 | Sakaya et al. | 359/73 |
| 5,631,755 | 5/1997 | Sakaya | 349/117 |

FOREIGN PATENT DOCUMENTS

| | | |
|---|---|---|
| 0 541308 | 5/1993 | European Pat. Off. . |
| 5-54428 | 8/1993 | Japan . |
| 7-318982 | 12/1995 | Japan . |

OTHER PUBLICATIONS

Handbook of Optics, Driscoll and Vaughan, Eds., Optical Society of America, 1978, pp. 10–108–10–109.

W.G. Driscoll et al., "Handbook", McGraw Hill/Optical Society of America, 1978, pp. 10–103 —10–109.

*Primary Examiner*—Timothy M. Speer
*Attorney, Agent, or Firm*—Sughrue, Mion, Zinn, Macpeak & Seas, PLLC

[57] ABSTRACT

A phase retarder film comprising a layer of polyvinyl alcohol or a derivative thereof and a water-swellable layered inorganic compound, wherein the in-plane retardation value is smaller than the retardation value in the thickness direction, sometimes causes durability failures, that is, the layer is peeled off from a transparent resin substrate in high temperature and high humidity environment. Therefore, the present invention provides a phase retarder film which is superior in durability.

With respect to a phase retarder film comprising at least one layer containing at least one organic clay compound which can be dispersed in an organic solvent, wherein the in-plane retardation value is smaller than the retardation value in the thickness direction, the durability is remarkably improved.

23 Claims, No Drawings

PHASE RETARDER AND LIQUID CRYSTAL DISPLAY DEVICE USING THE SAME

BACKGROUND OF THE INVENTION

1. Field of the Invention

The present invention relates to a phase retarder film whose durability is improved, and a liquid crystal display device using the same.

2. Related Prior Art

U.S. Pat. No. 5,430,566 discloses a phase retarder film wherein the in-plane refractive index is different from the refractive index in the thickness direction. Since a crystalline layer unit of an layered inorganic compound used in this phase retarder film has a stratified structure, when the film is formed by using the layered inorganic compound alone or in combination with a resin on a transparent resin substrate, the crystalline layer units are oriented parallel to the surface of the transparent resin substrate, and randomly oriented in the plane direction. As a result, this phase retarder film has optical characteristics that the in-plane refractive index is larger than the refractive index in the thickness direction, and exhibits optical characteristics that the in-plane retardation value is smaller than the retardation value in the film thickness direction.

A layered inorganic compound layer formed on an isotropic transparent resin substrate has optical characteristics that the in-plane retardation value is approximately 0 nm and the retardation value in the thickness direction is larger than that. The retardation value in the thickness direction [R'= (nXY−nZ)·d (nXY: average in-plane refractive index, nZ: refractive index in the thickness direction, d: thickness of the film)] as a parameter of the optical characteristics can be easily controlled to a predetermined value, and a uniform phase retarder film having large area can be produced. This phase retarder film can be used for improving the viewing angle characteristics of a vertically aligned nematic (VAN) type liquid crystal display device and a 90 degrees twisted nematic (TN) type liquid crystal display device.

It is also possible to control a ratio (R40/R0) of the retardation value measured by inclining by 40 degrees around the slow axis to the in-plane retardation value (R0) within the range from 0.9 to 1.1 by a method of forming a layered inorganic compound layer directly on a uniaxially oriented film having a negative birefringent anisotropy, such as polystyrene, as a transparent resin substrate, or a method of forming a lavered inorganic compound layer on an isotropic transparent resin substrate, followed by laminating with a uniaxially oriented film having a negative birefringent anisotropy, such as polystyrene, by using an adhesive. By using these retardation films, it is also possible to improve the viewing angle characteristics of a super-twisted nematic (STN) type liquid crystal display device.

Furthermore, it is possible to control R40/R0 within the range larger than 1.1 by a method of forming a layered inorganic compound layer directly on a uniaxially oriented film having a positive birefringent anisotropy, such as polycarbonate, as a transparent resin substrate, or a method of forming a layered inorganic compound layer on an isotropic transparent resin substrate, followed by laminating with a uniaxially oriented film having a positive birefringent anisotropy, such as polycarbonate, by using an adhesive. By using these retardation films, it is also possible to improve the viewing angle characteristics of an optically compensated birefringent (OCB) type liquid crystal display devices such as a bend aligned nematic ($\pi$ cell) type liquid crystal display device, a hybrid aligned nematic (HAN) liquid crystal display device and the like.

In the production of this phase retarder film, a water-soluble resin and a layered inorganic compound are preferably used in combination in view of the formability of the layer comprising a layered inorganic compound on a transparent resin substrate, exhibition of optical characteristics, mechanical characteristics and the like. Particularly, a method of applying a water dispersion containing polyvinyl alcohol or a derivative thereof and a water-swellable layered inorganic compound on a transparent resin substrate to form a film is preferably used.

A phase retarder film produced by applying a water dispersion containing polyvinyl alcohol or a derivative thereof and a water-swellable layered inorganic compound on a transparent resin substrate disclosed in U.S. Pat. No. 5,430,566 is superior in optical characteristics. However, there sometimes arises a durability failure in high temperature and high humidity environment in a state of interposing the phase retarder film between a polarizing film and a liquid crystal cell and laminating by using an adhesive, that is, the layer of polyvinyl alcohol or a derivative thereof and a water-swellable layered inorganic compound is peeled off from the transparent resin plate.

It is considered that this durability failure occurs in the following manner. That is, since a water-soluble resin and a hydrophilic compound such as water-swellable layered inorganic compound are mainly used, they absorb a large amount of water in high humidity environment to cause volume expansion larger than that of the transparent resin substrate and, at the same time, deterioration of adhesion at the interface due to softening of the water-soluble resin occurs.

As a phase retarder using a layered inorganic compound, there is known a plate having a suitable thickness made of a mica crystal by utilizing the cleavage property thereof, wherein the in-plane retardation value is adjusted to $\lambda/4$, as described in Handbook of Optics (W. G. Driscoll et al., Optical Society of America, McGraw-hill, USA, 1978), page 10–108, sections 57, 58. However, since the cleavage property of the crystal is utilized, it is difficult to obtain a uniform plate having wide area, which can be used in the liquid crystal display device. Since the plate is composed of a single crystal and a ratio of the in-plane retardation value (R) to the retardation value (R') in the thickness direction is constant, R is uniquely decided when R' is designed to an arbitrary value. Furthermore, R exceeds 50 nm when R' becomes large such as several hundreds nm. That is, R' can not be controlled optionally by maintaining R at a small value.

Under these circumstances, the present inventors have studied intensively. As a result, there could be developed a phase retarder film which has excellent durability, wide area and uniform optical characteristics, wherein the in-plane retardation value is smaller than the retardation value in the film thickness direction, by using an organic clay compound which can be dispersed in an organic solvent. Thus, the present invention has been accomplished.

SUMMARY OF THE INVENTION

An object of the present invention is to provide an improved phase retarder having excellent durability, wide area and uniform optical characteristics.

Another object of the present invention is to provide a liquid crystal display device which is superior in viewing angle characteristics and durability, causing no failures such as peeling of the phase retarder in high temperature and high humidity environment.

These and other objects and effects of the present invention will become apparent from the following description.

The present invention relates to the followings.

(1) A phase retarder film comprising at least one layer containing at least one organic clay compound which can be dispersed in an organic solvent.

(2) A phase retarder film comprising at least one layer containing at least one organic clay compound which can be dispersed in an organic solvent, wherein the in-plane retardation value is not more than 50 nm and is smaller than the retardation value in the thickness direction.

(3) A phase retarder film comprising a layer containing at least one organic clay compound which can be dispersed in an organic solvent, and a transparent resin substrate, said layer being formed on at least one surface of said transparent resin substrate, wherein the in-plane retardation value is not more than 50 nm and is smaller than the retardation value in the thickness direction.

(4) A liquid crystal display device wherein the phase retarder film of above (1), (2) or (3) is used.

DETAILED DESCRIPTION OF THE INVENTION

The organic clay compound which can be dispersed in an organic solvent used in the present invention refers to a compound which can be dispersed in an organic solvent among compounds prepared by combining a clay mineral having a stratified structure and an organic compound.

With respect to the clay mineral having a stratified structure, oxygen atoms or hydroxyl groups of Si—O, Si—OH or Al—OH are present on the surface and, furthermore, the space between crystalline layers is occupied by an exchangeable cation and a hydrated ion thereof. A hydrophobic organic clay compound can be prepared by a method of reacting these oxygen atoms or hydroxyl groups with an organic compound to combine them, or a method of exchanging the exchangeable cation with an organic cation to combine them.

With respect to a smectite group or a swellable mica as kinds of the clay mineral, Si in a tetrahedral layer of a crystalline structure is isomorphous-substituted with Al or Fe (III) and Al in an octahedral layer is isomorphous-substituted with Si or Fe (III) and, furthermore, Mg in an octahedral layer is isomorphous-substituted with Li. The exchangeable cation between crystalline layers, such as $Na^+$, $K^+$, $Ca^{2+}$, $Mg^{2+}$, $Al^{3+}$, etc. compensates for negative layer charge as a result of the isomorphous-substitution. With respect to these clay minerals, since a bond between crystalline layer units is comparatively weak and the interlayer space between the crystalline layer units is apt to becomes wide, when these clay minerals are dispersed in water, the interlayer space between the crystalline layer units swells until they exhibit a colloidal state to form a sol in water and, therefore, they exhibit a cation exchangeability. This cation exchange is effective for combining clay minerals with organic compounds. The smectite group is preferably used for forming a compound because the layer charge is comparatively small to other clay minerals and a sol can be easily formed and a cation exchangeability is high.

In addition, the smectite group is preferably used in the phase retarder film because of excellent transparency.

Examples of the smectite group include montmorillonite, hectorite, bentonite and their substituted bodies, derivatives and mixtures thereof. Among them, one prepared by chemical synthesis is preferably used for the phase retarder film because it contains little impurities and is superior in transparency. Particularly, a synthetic hectorite whose particle diameter is controlled to small is preferably used because scattering of visible light is inhibited.

The organic compound which is used in the organic clay compound used in the present invention may be any ionic compound capable of reacting with the oxygen atoms or hydroxyl groups of the clay mineral or any compound capable of exchanging with the exchangeable cation, wherein the resultant compound can be swelled or dispersed in an organic solvent, and is not specifically limited. Examples thereof include amine compound.

Examples of the amine compound include urea, hydrazine, dodecylpyridinium, quaternary ammonium compound and the like.

A quaternary ammonium compound can be preferably used because cation exchange can be easily conducted.

The quaternary ammonium compound is introduced as a cation, and examples of the compound include those having an alkyl or benzyl group, such as dimethyl dioctadecyl ammonium ion, dimethyl benzyl octadecyl ammonium ion, trioctyl methyl ammonium ion, etc.; and those having a long chain substituent, such as methyl diethyl polyoxypropylene (polymerization degree: 25) ammonium ion.

These quaternary ammonium compounds are preferably used in the same amount as the cation exchange capacity of the clay mineral. In the production, the quaternary ammonium compound may be added in the range of 0.5- to 1.5-fold amount based on the cation exchange capacity.

The organic clay compound combined with these quaternary ammonium compounds can be easily dispersed in various organic solvents such as low polarity aromatic hydrocarbons (e.g. benzene, toluene, xylene, etc.), ketones (e.g. acetone, methyl ethyl ketone, methyl isobutyl ketone, etc.), lower alcohols (e.g. methanol, ethanol, propanol, etc.), high polarity solvent such as halogenated hydrocarbons (e.g. carbon tetrachloride, chloroform, dichloromethane, dichloroethane, etc.) by appropriately selecting the quaternary ammonium compound to be used.

The organic clay compound which can be dispersed in an organic solvent thus obtained exhibits excellent effect in high temperature and high humidity environment when the phase retarder film is produced by using this organic clay compound. Some quaternary ammonium compound to be combined becomes discolored in high temperature environment and, therefore, it is necessary to inhibit the degree of discoloration within the permissible range.

When the phase retarder film of the present invention is applied to the liquid crystal display device, one or two phase retarder films are normally used. It is necessary to satisfy the permissible range of discoloration by using one phase retarder film but it is more preferred to satisfy the permissible range even when using two phase retarder films. In the present invention, the permissible range of discoloration means that a color difference $\Delta E^*$ between a color before a test in a $L^*a^*b^*$ color system (JIS Z-8729 according to the CIE 1976 ($L^*a^*b^*$)space) and a color after 1000 hours in the environment at the temperature of 80° C. is not more than 5.

When the organic clay compound which can be dispersed in an organic solvent thus obtained is dispersed in an organic solvent, the interlayer space between the crystalline layer units can be swollen until it exhibits a colloidal state. And by applying the dispersion containing the organic clay compound on a suitable substrate, followed by drying to form a layer, the crystalline layer units can be oriented, consequently, it becomes possible to use as a phase retarder film.

The higher a concentration of the organic clay compound in the dispersion in case of forming a layer of the organic clay compound becomes, the better because a thickness of the layer can be increased. When the concentration becomes too high, gelation occurs and the layer formability becomes poor. Therefore, the concentration is normally within the range from 2 to 20% by weight.

Furthermore, a plurality of these organic clay compound may be used in combination.

When using as the phase retarder film, it is possible to use the layer alone after removing from the substrate but is possible to use in a state that the layer is formed on a transparent substrate by using the transparent substrate.

When the substrate on which a layer is formed is plane, the crystalline layer units of the organic clay compound is oriented parallel to the plane, and randomly oriented in the in-plane direction, with respect to the substrate plane. Therefore, the in-plane refractive index is bigger than the refractive index in the thickness direction. This refractive index anisotropy makes it possible to use as a phase retarder film wherein the in-plane retardation value is not more than 50 nm and the in-plane retardation value is smaller than the retardation value in the film thickness direction.

As the transparent resin substrate, an isotropic transparent resin substrate can be used.

When using the isotropic transparent resin substrate, there is obtained the phase retarder film wherein the in-plane retardation value is smaller than the retardation value in the film thickness direction. The transparent resin substrate may be any film having a thickness of 50 to 200 $\mu$m, which has low orientation degree and is superior in uniformity, but is not specifically limited. Preferred is a film wherein the in-plane retardation value is controlled to not more than 20 nm. Examples of the film include cellulose film, polycarbonate film, polystyrene film, polysulfone film and acrylic film, which are produced by a solvent casting method, and acrylic film produced by a precision extrusion method of low residual stress. Among them, a triacetylcellulose film produced by a solvent casting method is preferred.

When using an uniaxially oriented film having a negative birefringent anisotropy as the transparent resin substrate, there can be obtained a film wherein a ratio (R40/R0) of the retardation value (R40) measured by inclining by 40 degrees around the slow axis to the in-plane retardation value (R0) is within the range from 0.9 to 1.1. This film can be used as a phase retarder film for improving the viewing angle characteristics of an STN type liquid crystal display device. Examples of the transparent resin substrate include uniaxially oriented film which can be obtained by forming a film from a polystyrene or acrylic resin having a negative birefringent anisotropy by a solvent casting method, followed by uniaxial stretching. It is preferred to use a polystyrene resin in view of ease of exhibiting retardation. Examples of the polystyrene resin include polystyrene, styrene-acrylonitrile copolymer, acrylonitrile-butadiene-styrene copolymer and the like.

When using an uniaxially oriented film having a positive birefringent anisotropy as the transparent resin substrate, there can be obtained a film wherein R40/R0 is larger than 1.1. This film can be used as a phase retarder film for improving the viewing angle characteristics of an OCB type liquid crystal display device. Examples of the transparent resin substrate include uniaxially oriented film which can be obtained by forming a film from a polycarbonate, polyester or polysulfone resin having a positive birefringent anisotropy by a solvent casting method, followed by uniaxial stretching. It is preferred to use a polycarbonate resin in view of ease of exhibiting retardation and ease of stretching.

A method of using an organic clay compound in combination with a hydrophobic resin is preferably used in view of ease of layer formability on the substrate, exhibition of optical characteristics, and mechanical characteristics.

The hydrophobic resin used in the present invention may be any one which can be dissolved in an organic solvent capable of dispersing the organic clay compound, and is not specifically limited. The hydrophobic resin, which is dissolved in a low polarity organic solvent such as benzene, toluene, xylene, etc., is preferably used. Examples of the hydrophobic resin include polyvinyl acetal resin such as polyvinyl butyral, polyvinyl formal, etc. and cellulose resin such as cellulose acetate butyrate, etc.

Some organic clay compound can be dispersed in a polar solvent. When using such an organic clay compound, there can also be used acrylic resin, polycarbonate resin and polyester resin, in addition to polyacetal resin and cellulose resin.

Furthermore, a plurality of these resins may be used in combination.

It is preferred to improve the mechanical characteristics (e.g. prevention of fracture of a layer of an organic clay compound and a hydrophobic resin, etc.) so that a composition ratio of an organic clay compound which can be dispersed in an organic solvent to a hydrophobic resin by weight is within the range from 1:2 to 10:1. A concentration of a solid content of the dispersion may be within the range where the resultant dispersion is not gelatinized or does not become cloudy for several days after production, but is not specifically limited. The concentration of the solid content of the sum total of the organic clay compound and the hydrophobic resin is normally within the range from 3 to 15% by weight. Since the optimum concentration of the solid content varies depending on the composition ratio of the organic clay compound to the hydrophobic resin, it is set for every composition ratio.

There may also be added additives such as viscosity adjustor for improving layer formability in case of forming a layer on a substrate, crosslinking agent for further improving the hydrophobic nature, durability and the like.

The phase retarder film of the present invention can be used for improving the viewing angle characteristics of a VAN type liquid crystal display device, a TN type liquid crystal display device, an STN type liquid crystal display device and an OCB type liquid crystal display device. In order to obtain an optimum retardation value in the thickness direction (R') according to the liquid crystal display device to which the phase retarder film is applied, the thickness of the layer containing at least one organic clay compound which can be dispersed in an organic solvent or the layer containing at least one organic clay compound which can be dispersed in an organic solvent and at least one hydrophobic resin, is controlled.

The thickness varies depending on the optical property of the organic clay compound and the composition ratio of the organic clay compound which can be dispersed in the organic solvent and the hydrophobic resin, but is normally set within the range from 1 to 50 $\mu$m.

In the present invention, in order to further strengthen the adhesion between the layer containing an organic clay compound which can be dispersed in an organic solvent and a transparent substrate, there may be preferably used means such as formation of an anchor coat layer on the transparent substrate, surface treatment (e.g. corona treatment, etc.) of the surface of the transparent substrate, etc.

The anchor coat layer may be any one which makes it possible to uniformly apply a dispersion containing the organic clay compound which can be dispersed in the organic solvent on the substrate, and is capable of improving the adhesion, but is not specifically limited. Examples of the resin of anchor coat layer containing an urethane resin and an acrylic resin.

A method of forming the layer comprising of the organic clay compound which can be dispersed in the organic solvent, the layer comprising of the organic clay compound which can be dispersed in the organic solvent and the hydrophobic resin, and the anchor coat layer on the transparent resin substrate is not specifically limited, but there can be used coating methods such as direct gravure method, reverse gravure method, die coating method, comma coating method, bar coating method and the like. Among them, the comma coating method and the die coating method using no back-up roll are preferably used because of excellent precision in thickness.

The phase retarder film thus produced of the present invention is superior in transparency, and has a light transmittance of not less than 80%, which is necessary for using in the liquid crystal display device.

When the phase retarder film of the present invention is applied to the liquid crystal display devise, al least one phase retarder film of the present invention may be disposed between a polarizing film and a liquid crystal cell. When one phase retarder film is not enough to improve the optical characteristics, laminated two phase retarder films may be disposed. In order to obtain an asymmetric property of the viewing angle characteristics, phase retarder films may be separately disposed between upper and lower polarizing films and a liquid crystal cell.

According to the present invention, there can be obtained a phase retarder film comprising an organic clay compound which can be dispersed in an organic solvent or a phase retarder film containing an organic clay compound which can be dispersed in an organic solvent, wherein the in-plane retardation value is smaller than the retardation value in the thickness direction, said phase retarder film being superior in optical characteristics and durability, causing no failures such as peeling in high temperature and high humidity environment.

By using the phase retarder film of the present invention, there can be obtained a liquid crystal display device which is superior in viewing angle characteristics and durability.

EXAMPLES

The measurement and evaluation of samples were carried out by the following method.

(1) The light transmittance of the phase retarder film was measured by using a spectrophotometer UV2200 manufactured by Shimazu Corp.

(2) The in-plane retardation value of the phase retarder film was measured by a polarizing microscope Optiphotopol manufactured by Nikon Co., Ltd. at monochromic light having a wavelength of 546 nm, according to Senarmont method.

The retardation value in the film thickness direction was calcurated by general method by using R0, R30 (retardation value measured by inclining by 30 degrees around the slow axis), d(thickness of the pase retarder film) and the average reflective index of the phase retarder film assumed 1.5.

(3) The heat discoloration resistance test was conducted as follows. That is, with respect to L*a*b* color system of one produced by laminating two phase retarder films and a glass plate using an adhesive (standard source C, CIE 1931 colorimetric system), initial $L^{*0}a^{*0}b^{*0}$ and $L^{*1}a^{*1}b^{*1}$ after standing in the environment at 80° C. for 1000 hours were measured by using a calorimeter CT-210 manufactured by Minoruta Co., Ltd., and then the heat discoloration resistance was evaluated by a color difference $\Delta E^*$ calculated by the following equation:

$$\Delta E^* = [(L^{*1}-L^{*0})^2+((a^{*1}-a^{*0})^2+(b^{*1}-b^{*0})^2]^{1/2}$$

(4) The durability test under high temperature and high humidity environment was conducted as follows. That is, one produced by interposing one phase retarder film between a polarizing film (SK-1842AP7, manufactured by Sumitomo Chemical Industries Co., Ltd.) and a liquid crystal cell and laminating them using an adhesive (125 mm×95 mm, the absorption axis of the polarizing film and the slow axis of the phase retarder film when the phase retarder film has an in-plane retardation value are adjusted so that the axis makes an angle of 45° counterclockwise on the basis of the long side) was allowed to stand in the environment of a temperature of 60° C. and a relative humidity of 90% for 500 hours. Then, it was observed whether failures such as peeling occur at the interface between a layer containing an organic clay compound which can be dispersed in an organic solvent and a transparent resin substrate or not.

Example 1

An organic solvent dispersion containing 1.75% of a hydrophobic resin (trade name: Denka Butyral #3000-K, manufactured by Denki Kagaku Kogyo Co., Ltd.), 3.94% of an organic clay compound 1 (trade name: Lucentite STN, manufactured by Co-op Chemical Co., Ltd.), 1.31% of an organic clay compound 2 (trade name: Lucentite SPN, manufactured by Co-op Chemical Co., Ltd.), 65.1% of toluene, 18.6% of methylene chloride and 9.3% of acetone (hereinafter referred to as dispersion A) was applied on an isotropic transparent resin substrate (hereinafter referred to as a substrate "a") made of a triacetylcellulose film having a thickness of 80 μm (trade name:FUJITAC SH-80, manufactured by Fuji Photo Film Co., Ltd.) by using a bar coater so that the film thickness after drying becomes about 6 μm, followed by drying in an oven at 85° C. to obtain a phase retarder film of the present invention.

The results of the optical characteristics test and durability test of this film are shown in Table 1. As is shown in Table 1, this film had excellent characteristics in not only the optical characteristics test but also the durability test.

Example 2

The dispersion A was applied on an isotropic transparent resin substrate (hereinafter referred to as a substrate "b") made of a corona-treated triacetylcellulose film having a thickness of 80 μm (trade name:FUJITAC SH-80, manufactured by Fuji Photo Film Co., Ltd.) by using a comma coater so that a film thickness after drying becomes about 17 μm, followed by drying in an oven at 85° C. to obtain a phase retarder film of the present invention.

The results of the optical characteristics test and durability test of this film are shown in Table 1. As is shown in Table 1, this film had excellent characteristics in not only the optical characteristics test but also the durability test.

Example 3

According to the same manner as that described in Example 2 except that the thickness of the layer of the organic clay compound and hydrophobic resin of Example 2 is about 48 μm, a phase retarder film of the present invention was obtained.

The results of the optical characteristics test and durability test of this film are shown in Table 1. As is shown in Table 1, this film had excellent characteristics in not only the optical characteristics test but also the durability test.

Example 4

The dispersion A was applied on an isotropic transparent resin substrate (hereinafter referred to as a substrate "c") made by forming an acrylic UV curing resin (as an anchor coat layer) having a thickness of about 5 μm on one surface of a triacetylcellulose film having a thickness of 80 μm (trade name:FUJITAC SH-80, manufactured by Fuji Photo Film Co., Ltd.) by using a comma coater so that the film thickness after drying becomes about 16 μm, followed by drying in an oven at 85° C. to obtain a phase retarder film of the present invention.

The results of the optical characteristics test and durability test of this film are shown in Table 1. As is shown in Table 1, this film had excellent characteristics in not only the optical characteristics test but also the durability test.

Example 5

An organic solvent dispersion containing 2.50 of a hydrophobic resin (trade name: Denka Butyral #3000-K, manufactured by Denki Kagaku Kogyo Co., Ltd.), 5.63% of an organic clay composite 1 (trade name: Lucentite STN, manufactured by Co-op Chemical Co., Ltd.), 1.87% of an organic clay composite 2 (trade name: Lucentite SPN, manufactured by Co-op Chemical Co., Ltd.), 63.0% of toluene, 18.0% of methylene chloride and 9.0% of acetone (hereinafter referred to as dispersion B) was applied on a substrate "b" by using a bar coater so that a film thickness after drying becomes about 11 μm, followed by drying in an oven at 85° C. to obtain a phase retarder film of the present invention.

The results of the optical characteristics test and durability test of this film are shown in Table 1. As is shown in Table 1, this film had excellent characteristics in not only the optical characteristics test but also the durability test.

Comparative Example 1

A water dispersion containing 3.7% of synthetic hectorite (trade name: Laponite XLS, manufactured by Laporte Co.) as a water-swellable layered inorganic compound and 4.4% of polyvinyl alcohol (trade name: KURARAY POVAL 103, manufactured by Kuraray Co.,Ltd., saponification degree: 98.5%, polymerization degree: 300) was applied on an isotropic transparent substrate made of a surface-saponified triacetylcellulose film having a thickness of 80 μm (trade name:FUJITAC SH-80, manufactured by Fuji Photo Film Co., Ltd.) by using bar coater so that a film thickness of the layer containing the polyvinyl alcohol and water-swellable layered inorganic compound after drying becomes about 16 μm, followed by drying in an oven at 100° C. to obtain a phase retarder film wherein the in-plane retardation value is smaller than the retardation value in the film thickness direction.

The results of the optical characteristics test and durability test of this film are shown in Table 1. As is shown in Table 1, this film is superior in optical characteristics but is inferior in adhesion between the layer containing the polyvinyl alcohol and water-swellable layered inorganic compound and transparent resin substrate.

TABLE 1

| | Transmittance | R0 (nm) | R' (nm) | ΔE* | Durability |
|---|---|---|---|---|---|
| example 1 | 91.0 | 10.0 | 130 | 0.6 | ○ |
| example 2 | 90.8 | 9.8 | 270 | 0.7 | ○ |
| example 3 | 90.2 | 9.8 | 653 | 0.8 | ○ |
| example 4 | 90.5 | 9.0 | 274 | 0.7 | ○ |
| example 5 | 90.5 | 8.5 | 170 | 0.7 | ○ |
| Comparative Example 1 | 90.6 | 7.2 | 300 | 0.6 | X |

Re: Durability
○ : No failures occurred until 500 hours have passed.
X: Peeling occurred between a layer containing polyvinyl alcohol and the water-swellable layered inorganic compound and the transparent resin substrate film until 500 hours have passed.

What is claimed is:

1. A phase retarder film comprising at least one layer containing at least one organic clay compound which can be dispersed in an organic solvent, wherein the organic clay compound is prepared by combining a clay mineral having a stratified structure and an organic compound.

2. The phase retarder film according to claim 1, wherein the clay mineral is a smectite group or a swellable mica.

3. The phase retarder film according to claim 1, wherein the clay mineral is hectorite.

4. The phase retarder film according to claim 1, wherein the organic compound is an amine compound.

5. The phase retarder film according to claim 4, wherein the amine compound is a quaternary ammonium compound.

6. A phase retarder film comprising at least one layer containing at least one organic clay compound which can be dispersed in an organic solvent, wherein the organic clay compound is prepared by combining a clay mineral having a stratified structure and an organic compound, and the in-plane retardation value is not more than 50 nm and is smaller than the retardation value in the thickness direction.

7. The phase retarder film according to claim 6, wherein the clay mineral is a smectite group or a swellable mica.

8. The phase retarder film according to claim 6, wherein the clay mineral is hectorite.

9. The phase retarder film according to claim 6, wherein the organic compound is an amine compound.

10. A phase retarder film comprising at least one layer containing an organic clay compound which can be dispersed in an organic solvent, and a transparent resin substrate, said layer being formed on at least one surface of said transparent resin substrate, wherein the organic clay compound is prepared by combining a clay mineral having a stratified structure and an organic compound, and the in-plane retardation value is not more than 50 nm and is smaller than the retardation value in the thickness direction.

11. The phase retarder film according to claim 10, wherein the transparent resin substrate is an isotropic transparent resin substrate.

12. The phase retarder film according to claim 11, wherein the isotropic transparent resin substrate is a triacetylcellulose film produced by a solvent casting method.

13. The phase retarder film according to claim 10, wherein the layer containing at least one organic clay compound is formed through an anchor coat layer on at least one surface of the transparent resin substrate.

14. The phase retarder film according to claim 10 or 13, wherein the layer containing at least one organic clay compound is formed on at least one surface of the transparent resin substrate whose surface is subjected to a corona treatment.

15. The phase retarder film according to claim 1, 6 or 10, wherein the layer containing at least one organic clay compound is composed of a composition containing at least one organic clay compound and at least one hydrophobic resin.

16. The phase retarder film according to claim 15, wherein the composition ratio of the organic clay compound to the hydrophobic resin by weight is within the range from 1:2 to 10:1.

17. The phase retarder film according to claim 15, wherein the hydrophobic resin is a vinyl resin or a cellulose resin.

18. The phase retarder film according to claim 15, wherein the hydrophobic resin is polyvinyl butyral.

19. The phase retarder film according to claim 1, 6 or 10, wherein a thickness of the layer containing at least one organic clay compound is from 1 to 50 μm.

20. A liquid crystal display device wherein the phase retarder film of claim 1, 6 or 10 is used.

21. The phase retarder film according to claim 10, wherein the clay mineral is a smectite group or a swellable mica.

22. The phase retarder film according to claim 10, wherein the clay mineral is hectorite.

23. The phase retarder film according to claim 10, wherein the organic compound is an amine compound.

* * * * *